Jan. 21, 1941.                A. D. PARK                2,229,255
            METHOD OF MAKING ACOUSTICAL PANELS
                     Filed March 30, 1938
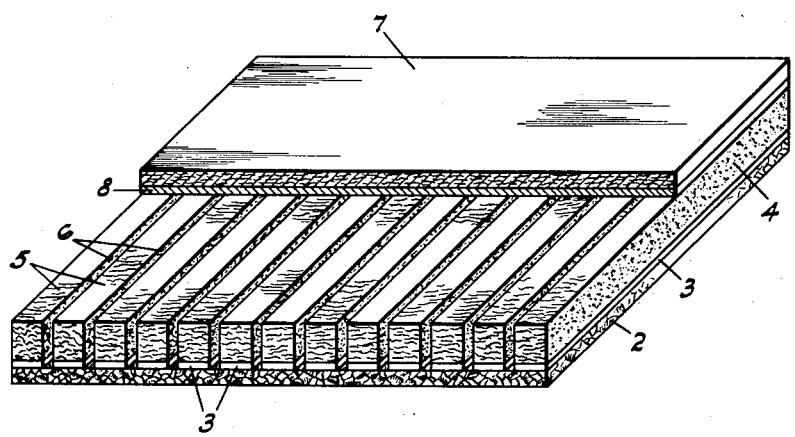
Inventor
Arthur D. Park
by
Attorney Patented Jan. 21, 1941

2,229,255

UNITED STATES PATENT OFFICE 2,229,255

METHOD OF MAKING ACOUSTICAL PANELS

Arthur D. Park, Lancaster, Pa., assignor to Armstrong Cork Company, Lancaster, Pa., a corporation of Pennsylvania Application March 30, 1938, Serial No. 198,801

5 Claims. (Cl. 154—28)

This invention relates to acoustical panels and the method of making the same and, more particularly, to preformed acoustical units adapted to be installed in offices, churches, auditoriums and, generally in rooms where relief from unpleasant sound effects, caused by reflection and reverberation of sound waves is desirable. Such units are designed to eliminate such unpleasant and annoying effects by absorption of the sound waves.

In my copending application, Serial No. 44,501, filed October 11, 1935, there is disclosed an acoustical panel comprising a non-sound-absorbing base, a structure of sound absorbing material mounted thereon and an outer covering or facing pervious to sound, which will permit the passage of sound waves to the interior of the panel. While such structure is highly desirable and practicable in use, it is relatively expensive due, of course, to the amount of labor and time required to assemble the unit. I have devised an improved acoustical panel of this general type in which the material forming the sound absorbing core is so chosen and formed as to expose to sound waves its surfaces having the greatest sound absorbing efficiency, and further, a method of making the same, whereby the assembling operation can be performed with a minimum expenditure of time and labor and without decreasing the efficiency of the unit.

Fiberboards commonly used for insulating board purposes are customarily waterlaid felt sheets. By reason of having found their relative positions through flotation, the fibers in such boards tend to lie more or less parallel to the surfaces of the insulating board, so that when a board so formed is severed, as for example by sawing, the cut edge contains a large portion of severed fiber ends. These fiber end surfaces have a reduced capacity for reflecting sound waves and an increased capacity for absorption of sound waves as compared with the faces of such board.

This invention relates to an acoustical panel in which such method of increasing the sound absorption capacity of fiberboard is utilized to expose to sound waves surfaces having the greatest sound absorbing efficiency. An object of my invention is to provide an economical and practicable method of making acoustical panels without decreasing their sound absorbing efficiency so that such panels may be sold at a price commensurate with other materials on the market of less efficiency.

In order that my invention may be readily understood, I will describe the manufacture of a one-foot-square panel, as an example. Referring to the drawing, which is an oblique view partially broken away to illustrate the steps of manufacture, there is shown a 12"x12"x½" layer of corkboard 2 which in the finished panel acts as a decorative covering or facing for the panel; such facing 2 is placed in a plane surface and an adhesive coating 3 is applied thereto. A stratum 4 of felted fibrous material such as fiberboard approximately 12"x12"x1½" is placed thereover and substantially coextensive therewith and is secured to the facing by the adhesive 3. The adhesive 3 should be somewhat viscous to prevent any substantial penetration into either the facing 2 or the felted fibrous material 4. The adhesive is permitted to set. After the adhesive has set, thereby securely retaining the felted fibrous material and the facing as a unit, the unit is run through a gang of circular saws placed approximately ¾" apart, which sever only the material 4 into a plurality of separate sound absorbing strips 5, each approximately 12"x1½"x¾" in size, the strips presenting severed surfaces lying in parallel relationship with similar surfaces on adjacent strips and defining channels 6 therebetween. The fiberboard 4 is so arranged that the saws sever it in a direction normal to the length of the majority of the fibers so that the severed surfaces defining the channels 6 are composed largely of severed fiber ends thereby greatly increasing the sound absorption capacity of such surfaces over other surfaces of the board since the openings therein so exposed are generally more numerous and of greater depth than openings on other surfaces of the board. In the panel described, thirteen separate strips are made providing twelve separate channels.

The adhesive at the bottom of the channels should be removed in order that sound waves may penetrate the channels when the finished panel is in use. Preferably, the saws are so adjusted as to penetrate to a slight extent within the corkboard at the time the board 4 is severed into separate sound absorbing strips, thereby removing the layer of adhesive interposed between the formed channels and the facing without disturbing the remaining adhesive retaining the separate strip to the facing.

A supporting backing 7 of asphalt impregnated felt substantially the same size as the facing 2 is securely attached to the strips 5 by an adhesive coating 8. The backing 7 is preferably coated with the adhesive 8 and pressed against the sound absorbing strips 5 although if desired the adhesive coating may be placed on the strips and the backing then pressed thereagainst.

In a modification of the above invention I secure a stratum of felted fibrous material to a pervious facing, securing a second stratum of felted fibrous material to the opposite side of said facing, severing the structure into substantially equal segments along a plane in the center of the facing and parallel to the face of the fibrous material so as to present separate strata of felted fibrous material each having a sound pervious facing thereon, and then carry out the further steps of the process as described above. It will be understood, of course, that the step of severing the facing longitudinally into substantially equal segments may be deferred until the panels are completed. In other words, a panel may be completely assembled on each side of the facing; and then the facing severed to form separate panels.

Any other backing materials such as sheet metal, hard pressed fiberboard, cardboard and the like may be used, provided they possess the strength and rigidity required to support the panel. Other materials, such as open fabrics, perforated fiberboard, wire screening or the like may be substituted for the corkboard facing, provided such materials be sound pervious to permit sound waves to enter the channels in the sound absorbing material. Corkboard, felts, excelsior-magnesite board and other sound absorbing materials having the necessary physical strength may be employed in place of fiberboard.

The completed panels may be decorated with suitable paints or lacquers by hand or mechanical means and the edges of the panels may be bevelled if desired. In many cases, it may be more desirable from an economical standpoint to decorate the facing material before assembly. When facing materials, such as corkboard or the like, are used, decoration may be found unnecessary.

It will be understood that the efficiency of the acoustical panel described herein is due in part at least to the high amount of absorbing surface per unit of area of surface treated. My panel provides a sound absorption area which is equivalent to three times the surface area of the face of the panel when strips 12" x 1½" x ¾" are provided as above recited. A 12" x 12" panel thus has a sound absorbing area of 432 square inches. Such great sound absorption area, of course, is attributable to the fact that the strips are provided in spaced relationship with the severed edges lying normal to the face and thus providing channels bounded by severed surfaces of high sound absorptivity. Since the severed surfaces of the strips defining channels are composed largely of severed fiber ends the sound absorption capacity of such surfaces is greatly increased over other surfaces of the strips and thus the area of the sound absorbing core exposed to sound waves is composed entirely of surfaces of relatively high absorptivity.

With the same sound absorbing material, different effects may be created by variation of the spaces between adjacent strips in an assembly. I have observed that such structure can be made more effective at particular frequencies, if desired. I can state generally that better results are obtained at lower frequencies when the spaces or channels between absorbent strips are narrow. When such channels are wide, the absorption coefficients at the higher frequencies are improved.

Although the strips have been shown with parallel faces having equal widths of opening throughout their depth, it will be understood that the strips need not be severed in a direction perpendicular to the base but may be disposed at an angle if desired, it being my intent that there shall be a substantial opening or channel between adjacent strips at the surface upon which the sound waves to be absorbed first impinge.

My invention provides a new and improved acoustical panel of high efficiency and low cost. My invention provides an acoustical panel in which the sound absorbing core is so formed as to expose to sound waves those surfaces having the greatest sound absorbing efficiency. My invention further provides a rapid, efficient and economical method of assembling acoustical panels without sacrifice of sound absorbing efficiency. A large amount of the labor and time required in the assembling operation is avoided and thus results in a considerable saving. The method provided does not require a large amount of costly machinery nor does it require highly skilled labor.

While I have described and illustrated a preferred embodiment of my invention, it will be understood the invention may be otherwise embodied within the scope of the following claims.

I claim:

1. In the method of making an acoustical panel including a supporting backing, a sound absorbing core, and a sound pervious decorative facing, the steps comprising adhesively securing a sound absorbing stratum of felted fibrous material to a sound pervious facing, said sound absorbing stratum overlying said facing and being substantially coextensive therewith, severing said sound absorbing stratum while it is adhesively secured to said facing so as to form a plurality of severed surfaces composed of fibers severed in a direction normal to their length, said severed surfaces lying in parallel relationship with similar adjacent surfaces and defining channels therebetween, removing the portion of the adhesive at the bottom of said channels so as to permit sound waves to penetrate through the sound pervious facing to the channels defined by adjacent severed surfaces, and adhesively securing to said sound absorbing stratum a supporting backing substantially coextensive with said facing.

2. In the method of making an acoustical panel including a supporting backing, a sound absorbing core, and a sound pervious decorative facing, the steps comprising interposing an adhesive layer between a sound absorbing stratum of felted fibrous material and a sound pervious facing, said sound absorbing stratum overlying said facing and being substantially coextensive therewith, severing said sound absorbing stratum while it is secured to said facing into separate strips so as to present severed surfaces lying in parallel relationship with similar surfaces on adjacent strips and defining channels therebetween and in such direction that the fibers are severed in a direction normal to their length so that the severed ends of the fibers form said surfaces, removing the portion of the adhesive layer at the bottom of said channels so as to permit sound waves to penetrate through the sound pervious facing to the channels defined by adjacent sound absorbing strips, and adhesively securing to said strips a supporting backing substantially coextensive with said facing.

3. In the method of making acoustical panels, the steps comprising adhesively securing a stratum of sound absorbing material to a sound pervious facing, adhesively securing a second sound absorbing stratum to the opposite side of said sound pervious facing, bisecting said structure along a plane substantially in the center of said facing and parallel to the face of the sound absorbing stratum, respectively severing said strata into strips while secured to said facings so as to present severed surfaces lying in parallel relationship with similar surfaces on adjacent strips and defining channels therebetween, and removing the portion of the adhesive at the bottom of said channels so as to permit sound waves to penetrate through the sound pervious facings to the panels defined by adjacent severed surfaces.

4. In the method of making acoustical panels, the steps comprising adhesively securing a sound absorbing stratum of felted fibrous material to a sound pervious facing, adhesively securing a second sound absorbing stratum of felted fibrous material to the opposite side of said sound pervious facing, severing said strata into separate strips while secured to said facing so as to present severed surfaces lying in parallel relationship with similar surfaces on adjacent strips and defining channels therebetween, removing the portion of the adhesive at the bottom of said channels, adhesively securing supporting backings to said strata of severed strips, and severing said structure longitudinally to form substantially identical panels, each consisting of a supporting backing, a core of sound absorbing material and a sound pervious facing.

5. In the method of making an acoustical panel including a supporting backing, a sound absorbing core, and a sound pervious decorative facing, the steps comprising, interposing an adhesive layer between a sound absorbing stratum and a sound pervious facing, severing said stratum into separate strips while it is adhesively secured to the facing so as to present severed surfaces lying in parallel relationship with similar surfaces on adjacent strips and defining channels therebetween, removing the portion of the adhesive layer at the bottom of such channels so as to permit sound waves to penetrate through the sound pervious facing to the channels defined by adjacent sound absorbing strips, and adhesively securing to said strips a supporting backing substantially coextensive with said facing.

ARTHUR D. PARK.